US010498814B2

(12) United States Patent
Cao

(10) Patent No.: US 10,498,814 B2
(45) Date of Patent: Dec. 3, 2019

(54) NETWORK STORAGE NODE AND NETWORK STORAGE SYSTEM

(71) Applicant: EMC Corporation, Hopkinton, MA (US)

(72) Inventor: Yu Cao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 356 days.

(21) Appl. No.: 14/572,049

(22) Filed: Dec. 16, 2014

(65) Prior Publication Data
US 2015/0189020 A1 Jul. 2, 2015

(30) Foreign Application Priority Data
Dec. 26, 2013 (CN) .......................... 2013 1 0750662

(51) Int. Cl.
G06F 15/173 (2006.01)
H04L 29/08 (2006.01)

(52) U.S. Cl.
CPC .............. H04L 67/1097 (2013.01)

(58) Field of Classification Search
CPC .............. H04L 67/1097; H04L 41/00
See application file for complete search history.

(56) References Cited

U.S. PATENT DOCUMENTS

| 8,782,670 B2* | 7/2014 | Havemose | G06F 9/545 719/319 |
|---|---|---|---|
| 2005/0235288 A1* | 10/2005 | Yamakabe | G06F 9/5072 718/100 |
| 2008/0147754 A1* | 6/2008 | Littlefield | H04L 67/1097 |
| 2009/0046728 A1* | 2/2009 | Matthews | H04L 29/06 370/397 |
| 2011/0010518 A1* | 1/2011 | Kavuri | G06F 3/0647 711/165 |
| 2012/0078847 A1 | 3/2012 | Bryant et al. | |
| 2012/0096165 A1* | 4/2012 | Madduri | G06F 9/5011 709/226 |
| 2012/0222037 A1* | 8/2012 | Labat | G06F 9/5072 718/104 |
| 2012/0272237 A1* | 10/2012 | Baron | G06F 9/45558 718/1 |
| 2014/0007189 A1* | 1/2014 | Huynh | G06F 3/0622 726/3 |

(Continued)

FOREIGN PATENT DOCUMENTS

CN 101587639 11/2009
CN 101778002 7/2010
(Continued)

Primary Examiner — Jonathan A Bui
(74) Attorney, Agent, or Firm — BrainwoodHuang

(57) ABSTRACT

The present disclosure provides an apparatus for a network storage node, the network storage node comprising mass storage resources and computing resources, the apparatus comprising: a storage management module configured to use the computing resources to provide storage services based on the mass storage resources; and a negotiation control module configured to provide computing services based on the computing resources. By means of the apparatus, the network storage node can be scaled conveniently, so that computing resources in the network storage node are put into sufficient use and a waste of resources is avoided.

18 Claims, 6 Drawing Sheets

(56) References Cited

U.S. PATENT DOCUMENTS

2014/0115182 A1\* 4/2014 Sabaa ................ H04L 67/1097
709/232
2015/0033220 A1\* 1/2015 Venkat ................ G06F 9/45541
718/1

FOREIGN PATENT DOCUMENTS

| CN | 102667748 | 9/2012 |
| CN | 102819454 | 12/2012 |
| CN | 102882864 | 1/2013 |

\* cited by examiner

NETWORK STORAGE NODE AND NETWORK STORAGE SYSTEM

RELATED APPLICATION

This Application claims priority from Provisional Application Serial No. CN201310750662.6 filed on Dec. 26, 2013 entitled "AN APPARATUS AND METHOD FOR A NETWORK STORAGE NODE, A NETWORK STORAGE NODE USING THE SAME, AND A NETWORK STORAGE SYSTEM," the content and teachings of which are hereby incorporated by reference in their entirety.

FIELD OF THE INVENTION

Embodiments of the present disclosure relate to the field of network storage, and more particularly, to a network storage node, a network storage system, and an apparatus and method for a network storage node.

BACKGROUND OF THE INVENTION

With the rapid development of Internet technology, distributed network storage has become a topic of interest for research in the storage field, as big data, cloud and virtualization get popular. Consider a NAS system as an example, which has a modular node design, and an operating system containing a software suite for file system management, volume management and data protection. Nodes in a NAS cluster are constructed as rack-mountable enterprise appliances containing memory, CPU, networking, Non-Volatile Random Access Memory (NVRAM), low-latency interconnects, disk controllers and storage media.

Each node in the distributed cluster has compute or processing capabilities in addition to storage capabilities. The NAS operating system, for example, runs in each cluster node, manages the data stored in the node, and exposes to clients a single intelligent file system that spans all nodes within a cluster. EMC's Isilon® is one well-known example of such a scale-out design. However, traditional datacenter architectures are discrete with respect to compute and storage aspect. That is, although the network system providing storage services has computer capabilities, these compute capabilities are only used for supporting the operations of the NAS operating system and are not provided to users, and in most cases these compute capabilities are idle and inefficient for the network system.

SUMMARY OF THE INVENTION

According to an embodiment of the present disclosure, there is provided an apparatus for a network storage node, the network storage node comprising mass storage resources and computing resources, the apparatus including a storage management module configured to use the computing resources to provide storage services based on the mass storage resources; and a negotiation control module configured to provide computing services based on the computing resources.

According to one optional implementation of the present disclosure, the computing resources include a Central Processing Unit CPU and a memory.

According to one optional implementation of the present disclosure, the negotiation control module is further configured to communicatively couple to the storage management module to negotiate the allocation of the computing resources between the storage management module and the negotiation control module.

According to one optional implementation of the present disclosure, the negotiation control module is further configured to communicatively couple to the storage management module to logically isolate the mass storage resources and the computing resources.

According to one optional implementation of the present disclosure, the negotiation control module is further configured to communicatively couple to the storage management module to handle one or more input/output I/O operations.

According to one optional implementation of the present disclosure, the negotiation control module is further configured to provide an interface for the computing services.

According to one optional implementation of the present disclosure, the negotiation control module or the storage management module is implemented at least partially based on a virtual machine.

According to one optional implementation of the present disclosure, the negotiation control module is further configured to access the mass storage resources or the computing resources based on the storage management module. In one embodiment the storage management module and the negotiation control module can be combined into a single module, a network module, which can execute the task associated with each of these modules.

According to another embodiment of the present disclosure, there is provided a network storage node, comprising mass storage resources and computing resources, as well as various means for a network storage node as described above.

According to another embodiment of the present disclosure, there is provided a network storage system that includes a plurality of network storage nodes as described above. According to one optional implementation of the present disclosure, the negotiation control module in one network storage node within the network storage system is further configured to communicatively couple to a negotiation control module in another network storage node within the network storage system.

According to another embodiment of the present disclosure, there is provided a method for a network storage node, the network storage node including mass storage resources and computing resources, the method comprising: using the computing resources to provide storage services based on the mass storage resources; and providing computing services based on the computing resources.

According to one optional implementation of the present disclosure, the computing resources comprise a Central Processing Unit CPU and a memory.

According to one optional implementation of the present disclosure, the method further comprises negotiating the allocation of the computing resources between the storage management module and the negotiation control module.

According to one optional implementation of the present disclosure, the method further comprises logically isolating the mass storage resources and the computing resources.

According to one optional implementation of the present disclosure, the method further comprises handling one or more input/output I/O operations.

According to one optional implementation of the present disclosure, the method further comprises providing an interface for the computing services.

According to one optional implementation of the present disclosure, the computing services are implemented at least partially on the basis of virtual machines.

BRIEF DESCRIPTION OF THE DRAWINGS

Through the detailed description of some embodiments of the present disclosure in the accompanying drawings, the features, advantages and other aspects of the present disclosure will become more apparent, wherein identical reference numbers generally refer to the same components in exemplary embodiments of the present disclosure.

DETAILED DESCRIPTION

With reference to the accompanying drawings, a more detailed description is presented below in accordance with some preferred embodiments of the present disclosure. Although several preferred embodiments of the present disclosure are shown in the accompanying drawings, it should be understood that the present disclosure may be implemented in various different forms and should not be limited by the embodiments illustrated herein. On the contrary, provision of these embodiments is only to make the present disclosure more thorough and complete and in order to convey the scope of the present disclosure to those skilled in the art.

Explanations are given to some terms for the sake of illustration. The term "network storage system" as used throughout the context is a system consisting of one or more distributed cluster nodes that are networked and provides users with services like storage. As described above, the NAS system is one example of network storage systems. The term "network storage node" refers to respective cluster nodes that compose the "network storage system".

Figure 1A:
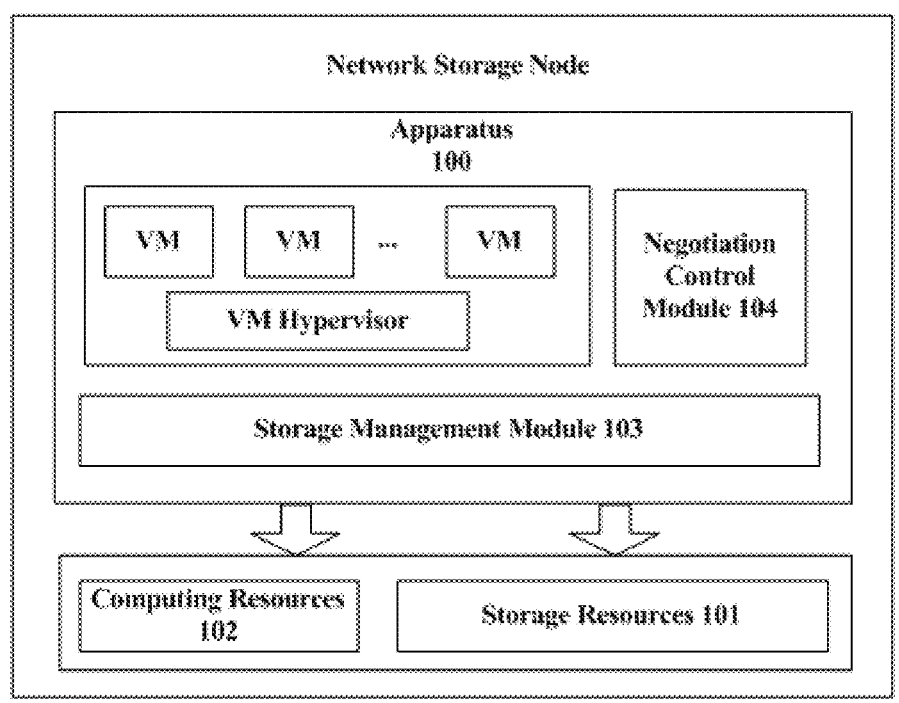
FIGS. 1A, 1B, and 1C illustrate block diagrams of an apparatus 100 for a network storage node and concrete exemplary layouts on the network storage node according to the embodiments of the present disclosure.
Figure 1B:
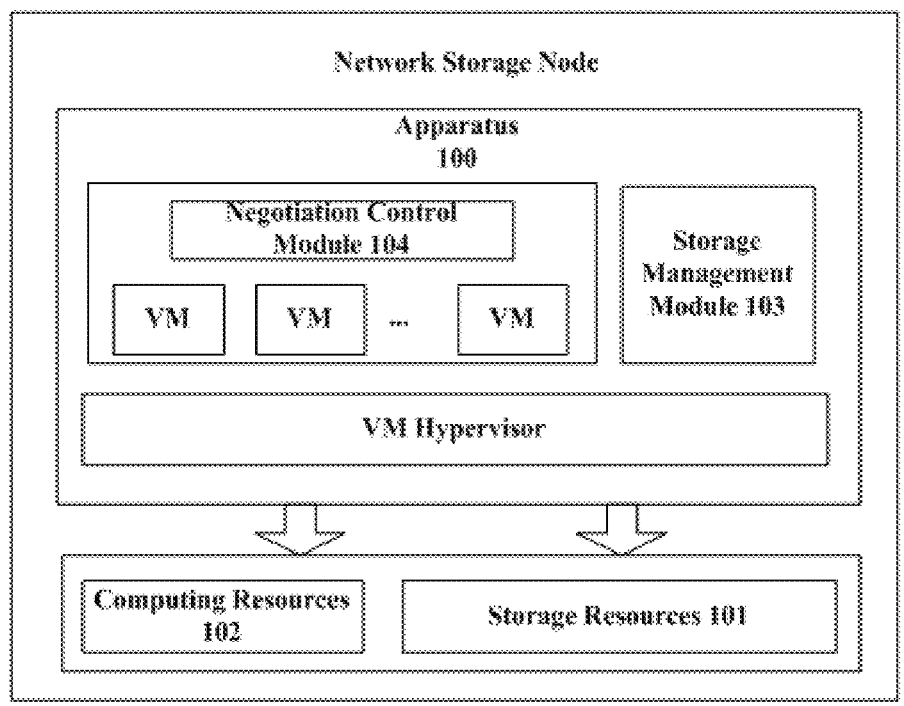
Figure 1C:
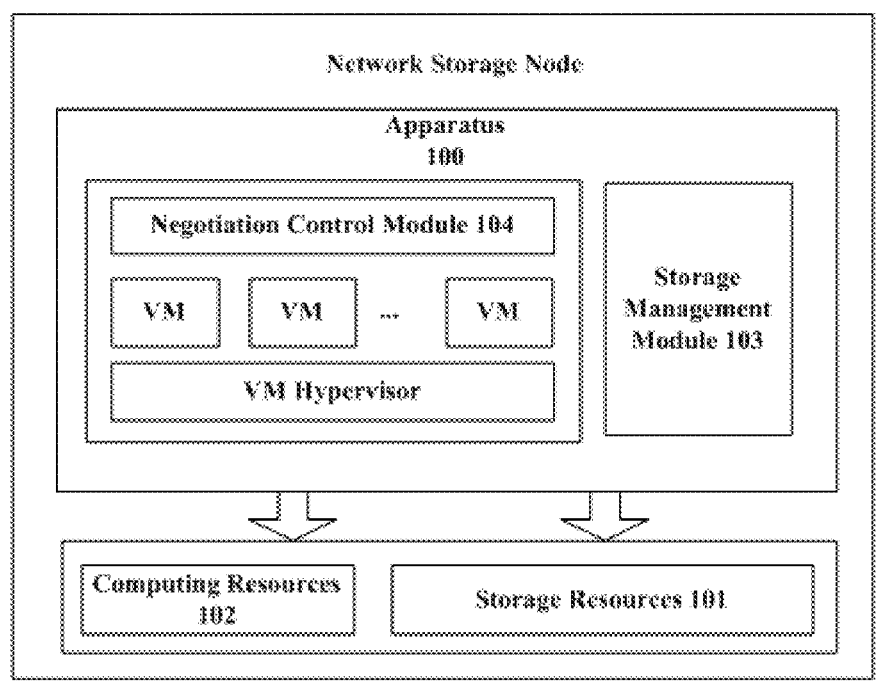

FIGS. 1A to 1C illustrate block diagrams of an apparatus 100 for a network storage node and layouts on the network storage node according to embodiments of the present disclosure. As shown in FIGS. 1A to 1C, the network storage node includes mass storage resources 101 and computing resources 102. Here mass storage resources 101 refer to various mass storage devices that provide storage services to clients. Apparatus 100 for a network storage node includes a storage management module 103 configured to use the computing resources to provide storage services based on the mass storage resources; and a negotiation control module 104 configured to provide computing services on the basis of the computing resources. In one embodiment, the storage management module 103 and the negotiation control module 104 can be combined into a single network module 107, the network module 107 configured to perform the tasks of both the storage management module 103 and the negotiation control module 104. Those skilled in the art should understand that computing resources 102 mentioned here include computing resources that support the network storage node to provide network storage services to clients. For example, the computing resource may include a Central Processing Unit CPU and a memory, and optionally, computing resources 102 may also include other computing resources that support provisioning of the network storage services. Embodiments of the present disclosure are not limited in this regard.

As described above, storage management module 103 is mainly responsible for managing the storage of data in mass storage resources 101 through the support from computing resources 102. In order to avoid waste of computing resources 102, negotiation control module 104 may schedule computing resources 102 to provide computing services to clients.

In one exemplary implementation, storage management module 103 may be configured to operate as an operating system of the network storage system and have full functionality of an operating system module of the traditional network storage system, and thus can achieve the management of storage resources by traditional means. Like an operating system of the traditional network operating system, storage management module 103 may be implemented via hardware resources (e.g., CPU, memory, etc.). However, those skilled in the art should understand that storage management module 103 may also be implemented at least partially on the basis of a virtual machine (e.g., a virtual machine running on the network storage node), or implemented as a combination thereof.

Similarly, negotiation control module 104 may also be implemented via hardware resources (e.g., CPU, memory, etc.), or implemented at least partially on the basis of a virtual machine (e.g., a virtual machine running on the network storage node), or implemented as a combination thereof. Embodiments of the present disclosure are not limited in this regard.

In addition, computing services provided by negotiation control module 104 may also be implemented at least partially on the basis of a virtual machine. For example, a plurality of virtual machines and a hypervisor of industrial standards may run on the network storage node. Various virtual machines separately or jointly execute a task (or a part of a task) associated with computing services, user applications and services such as enterprise workloads, private cloud projects, end user computing initiatives and big data efforts.

According to one embodiment of the present disclosure, negotiation control module 104 may be, for example, communicatively coupled to storage management module 103 to negotiate the allocation of computing resources 102 between storage management module 103 and negotiation control module 104. Specifically, negotiation control module 104 may interact with storage management module 103 to achieve necessary logical isolation between the storage and computing resources of a single node, and/or to negotiate the resource allocation (e.g., CPU cores and memory) between storage and computation.

According to another embodiment of the present disclosure, negotiation control module 104 may be, for example, communicatively coupled to storage management module 103 to handle one or more input/output I/O operations. Specifically, negotiation control module 104 may interact with storage management module 103 to handle all I/O operations for the local hypervisor, or for the virtual machines if a "passthrough" feature is enabled. As such, from the perspective of virtual machines, they will access storage resources 101 via the single file system exposed by storage management module 103.

According to another embodiment of the present disclosure, negotiation control module 104 is further configured to provide interfaces for computing services. For example, universal computation services are provided via user-oriented interfaces (e.g., command console and monitoring dashboard). Alternatively, these interfaces may be, for example, consolidated within storage management module 103 for users to easily deploy their applications and export application outputs.

Now with reference to FIGS. 1A to 1C, consideration is given to concrete exemplary layouts of apparatus 100 on the network storage node. As shown in FIG. 1A, storage management module 103 may be implemented directly on the basis of hardware resources (e.g., CPU, memory, etc.). For example, as described above, storage management module 103 may be configured to operate as an operating system of the network storage system. In this case, since storage management module 103 may be implemented as a full-functional operating system, i.e., it can host a type-2 hypervisor like KVM running virtual machines of user applications, while letting negotiation control module 104 run as its native application (hardware-based) or in another virtual machine. In the former case, negotiation control module 104 may be configured to access mass storage resources 101 and/or computing resources 102 on the basis of storage management module 103.

Alternatively, both storage management module 103 and negotiation control module 104 may be implemented using virtual machines as illustrated in FIG. 1B. In this implementation, the user applications, negotiation control module 104 and storage management module 103 can all run on virtual machines managed by a type-1 hypervisor like VMWare ESXi, which directly runs on hardware, and access hardware resources via such a hypervisor.

Alternatively, negotiation control module 104 and storage management module 103 may be configured to respectively, directly access mass storage resources and/or the computing resources. In this case, for example, let a type-1 hypervisor and the storage management module both run on the software, with negotiation control module 104 running in storage management module 103 or in a virtual machine. In the former case, negotiation control module 104 may be configured to access mass storage resources 101 and/or computing resources 102 on the basis of storage management module 103.

FIGS. 1A to 1C depict apparatus 100 for a storage node and its various implementations according to the embodiments of the present disclosure. It is obvious that the above architecture design of a scale-out compute capability network storage node cluster forms a solid infrastructure foundation for constructing a scalable, high-performance, ease-to-use, and cost-efficient cluster, not only for storage but also for computing.

According to another aspect of the present disclosure, there is further provided a network storage system consisting of a plurality of the above mentioned network storage nodes. In some implementations, all the virtual machines within or across different nodes will be connected with a new dedicated high-speed network like InfiniBand or gigabit Ethernet, which is separate from the existing front-end and back-end networks in the NAS cluster.

In a network storage system consisting of a plurality of the above mentioned network storage nodes, a negotiation control module in one network storage node may be further configured to communicate with a negotiation control module in another network storage node. For example, in one implementation, negotiation control module 104 on one node may manage the local virtual machines and also interact with other negotiation control modules 104 in other nodes, so that various virtual network technologies (e.g., peer-to-peer and DHT) can be realized between virtual machines, so as to cater to various application requirements in terms of performance, reliability, availability and manageability.

Figure 2:
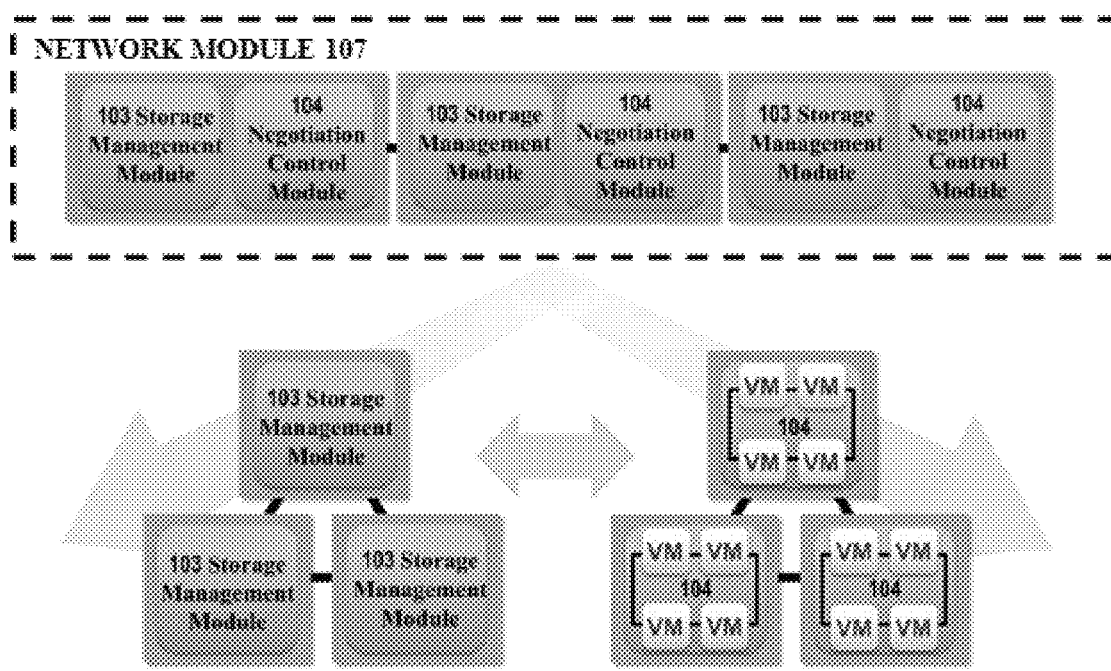
FIG. 2 illustrates a schematic view of a network storage cluster 200 according to one exemplary embodiment of the present disclosure.

Now with reference to FIG. 2, which illustrates a schematic view of a network storage cluster 200 according to one exemplary embodiment of the present disclosure. As illustrated in FIG. 2, at the high level, network storage clusters such as NAS will now be managed by both storage management module 103 and negotiation control module 104 (or alternatively network module 107, which is a combination of the storage management module and the negotiation control module), providing data storage and computing services respectively. As a result, for the customers, the cluster can be utilized either as a scale-out NAS as usual, or as a compute cluster of virtual machines, or both. The storage system according to the embodiment of the present disclosure increases the flexibility of the cluster.

The storage system according to the embodiment of the present disclosure enables additional performance optimization opportunities. An efficient way of handling big data is to move the computation into it. With such an integrated storage and computing network system according to the embodiment of the present disclosure, big data processing can be essentially accelerated to a large extent. Moreover, the existing techniques embedded in storage management modules like the NAS operating system may only provide generic storage resource optimizations that are applicable to several different kinds of applications. With the coexistence of both the data and the application logics, it is possible for an original storage management module to provide dynamic, fine-grained and highly customized optimizations according to the characteristics of the applications that are active or executing. For example, the data partitioning over nodes is intelligently optimized so as to maximize the co-location of data and the corresponding computing in the same node, and thus minimize the data transfer over the network.

Figure 3:
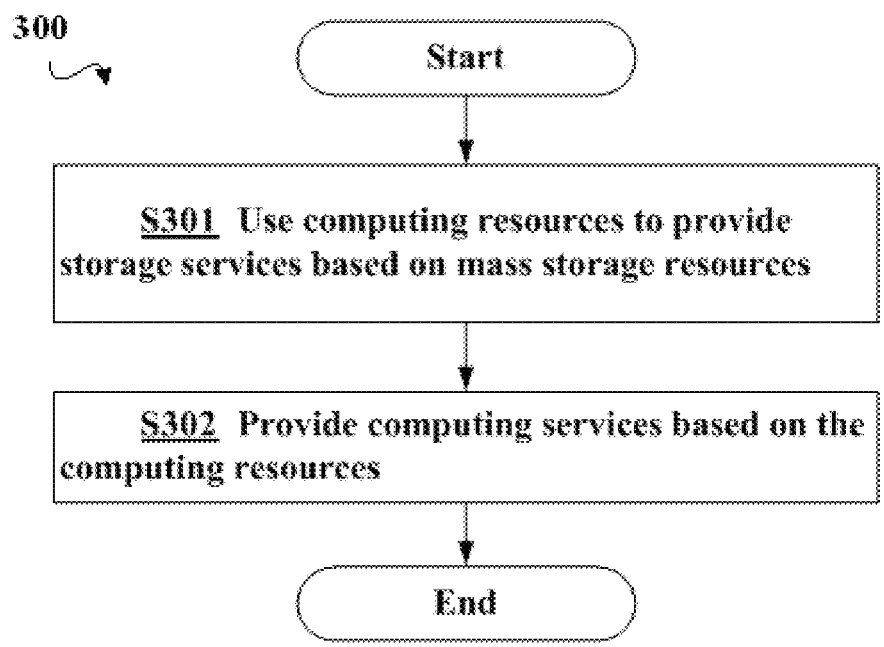
FIG. 3 illustrates a flowchart of a method 300 for a network storage node according to one exemplary embodiment of the present disclosure.

FIG. 3 illustrates a flowchart of a method 300 for a network storage node according to one exemplary embodiment of the present disclosure. Here the network storage node is similar to the network storage node that has been described with reference to FIGS. 1A to 1C, and includes the above-described mass storage resources and compute resources, which is not described in detailed here.

After method 300 starts, the flow first goes to step S301 where storage services based on the mass storage resources are provided using the computing resources. The computing resources may include, for example, a Central Processing unit CPU and a memory. This step may be executed in various traditional ways, and the present disclosure is not limited in this regard.

Next method 300 proceeds to step S302 where computing services are provided on the basis of the computing resources. Through step S302, computing resources that were originally only used for supporting the provision of storage services may also be used for providing computing services to clients, which results in avoiding a waste of resources.

In one optional implementation according to the embodiment of the present disclosure, method 300 further comprises negotiating the allocation of the computing resources between the storage management module and the negotiation control module.

In one optional implementation according to the embodiment of the present disclosure, method 300 further comprises logically isolating the mass storage resources and the computing resources.

In one optional implementation according to the embodiment of the present disclosure, method 300 further comprises handling one or more input/output I/O operations.

In one optional implementation according to the embodiment of the present disclosure, method 300 further comprises providing an interface for the computing services.

In one optional implementation according to the embodiment of the present disclosure, the computing services are implemented least partially on the basis of virtual machines.

As described above, according to the embodiment of the present disclosure, there is provided a converged, scalable, and general-purpose compute-and-storage infrastructure that can be easily upgraded from a traditional network storage system (e.g., NAS) system and can at least bring the following benefits to users:

1. Converged compute-and-storage systems can be built entirely with reliable hardware components, and are thus cost-effective. And, such a solution enables datacenters to build datacenter build-outs that are dramatically faster than what would be possible with legacy architectures.

2. A converged compute-and-storage system enables datacenter managers to add scale and performance exactly where it is needed. Convergence lets customers deploy the infrastructure that is required presently and to boost their compute and storage resources incrementally as their business grows.

3. A converged compute-and-storage solution lets customers manage resources from simplified interfaces. Customers are allowed to bring new applications online quickly and dramatically reduce operating expenses.

4. A converged compute-and-storage system delivers compute and storage resources that are preconfigured to work together. Datacenter managers can predict future build-out expenses, so that they can estimate return on investment (ROI) easily.

Figure 4:
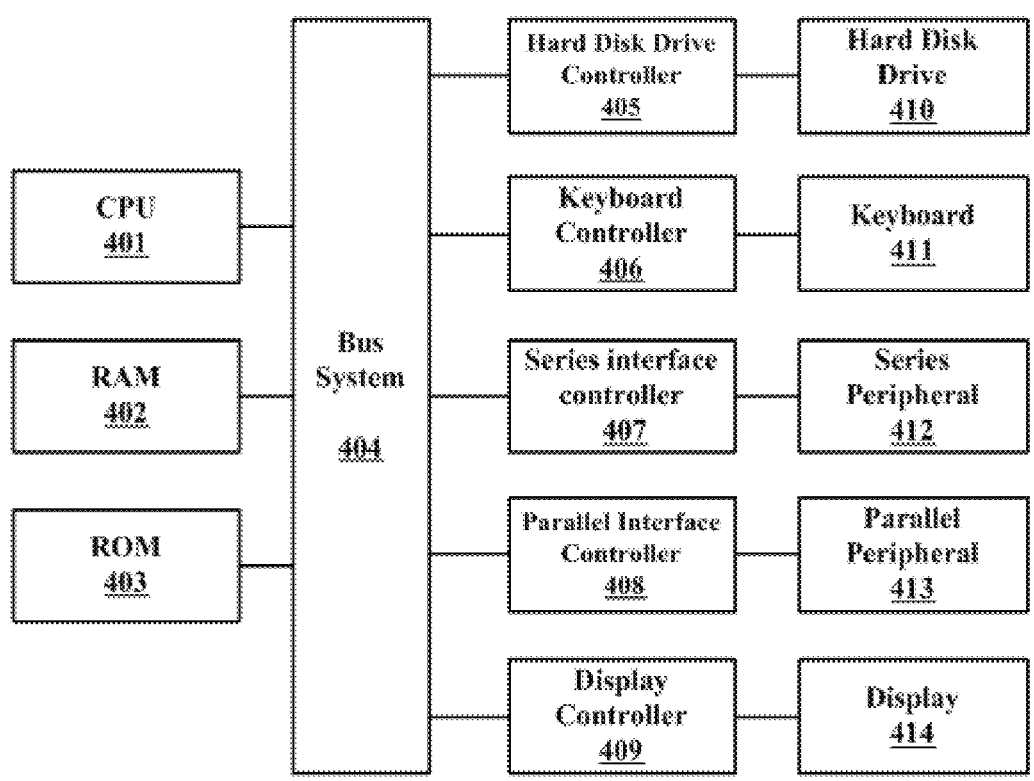
FIG. 4 shows an exemplary block diagram of a computer system which is applicable to implement the embodiments of the present disclosure, for example on each network storage node.

FIG. 4 illustrates an exemplary block diagram of a computer system, which is applicable to implement the embodiments of the present disclosure, for example on each network storage node. As illustrated in FIG. 4, the computer system may include: a CPU (Central Processing Unit) 401, a RAM (Random Access Memory) 402, a ROM (Read Only Memory) 403, a system bus 404, a hard disk controller 405, a keyboard controller 406, a serial interface controller 407, a parallel interface controller 408, a monitor controller 409, a hard disk 410, a keyboard 411, a serial peripheral device 412, a parallel peripheral device 413 and a monitor 414. Among these devices, connected to the system bus 404 are the CPU 401, the RAM 402, the ROM 403, the hard disk controller 405, the keyboard controller 406, the serial interface controller 407, the parallel interface controller 408 and the monitor controller 409. The hard disk 410 is coupled to the hard disk controller 405; the keyboard 411 is coupled to the keyboard controller 406; the serial peripheral device 412 is coupled to the serial interface controller 407; and the parallel peripheral device 413 is coupled to the parallel interface controller 408; and the monitor 414 is coupled to the monitor controller 409.

It should be understood that the structural block diagram in FIG. 4 is shown only for illustration purpose, and is not intended to limit the scope of the present disclosure. In some cases, some devices may be added or reduced as required. For example, the network module 107 may be added to such a computer device.

In particular, besides hardware embodiments, embodiments of the present disclosure may also be implemented in a form of a computer program product. For example, negotiation control module 104 as described with reference to FIGS. 1A to 1C may be implemented via a computer program product. This computer program product may be stored in RAM 402, ROM 403, hard disk 410 and/or any suitable storage medium as illustrated in FIG. 4, or downloaded to computer system 400 from a suitable location in the network. The computer program product may comprise computer code portions comprising program instructions that may be executed through a suitable processing device (for example, CPU 401 as shown in FIG. 4).

It should be noted that, embodiments of the present disclosure may be implemented as software, hardware or the combination thereof. The hardware part can be implemented by a dedicated logic; the software part can be stored in a memory and executed by a proper instruction execution system such as a microprocessor or a design-specific hardware. One of ordinary skill in the art may understand that the above-mentioned method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present disclosure may be implemented by hardware circuitry of a very large scale integrated circuit or gate array, a semiconductor such as logical chip or transistor, or a programmable hardware device such as a field-programmable gate array or a programmable logical device, or implemented by software executed by various kinds of processors, or implemented by combination of the above hardware circuitry and software such as firmware.

The communication network as mentioned in this specification may comprise various kinds of networks, including but not limited to local area network (LAN), wide area network (WAN), an IP-protocol based network (for example Internet), and a peer-to-peer network (for example ad hoc peer network).

It should be noted that although a plurality of units or subunits of the apparatuses have been mentioned in the above detailed depiction, such partitioning is merely non-compulsory. In actuality, according to embodiments of the present disclosure, the features and functions of two or more units above described may be embodied in one unit. On the contrary, the features and functions of one unit above described may be further partitioned to be embodied in more units.

In addition, although operations of the method of the present disclosure are described in specific order, it should not be construed as requiring or suggesting such operations be completed in the shown specific order, or as requiring all depicted operations to be executed for achieving desired results. On the contrary, the steps depicted in the flowchart may change execution order. Additionally or alternatively, some steps may be omitted, multiple steps may be combined to one step for execution, and/or one step may be decomposed into multiple steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. A network storage node, comprising:
   one or more data storage resources;
   one or more computing resources, including one or more processors and memory, in communication with the one or more data storage resources, wherein the computing resources are originally allocated only for data storage services;
   a network module configured to
      use the computing resources to provide data storage services based on the one or more data storage resources; and
      provide computation services to a client based on the computing resources; and
   an interface configured to communicate with a second network storage node, wherein resources from the second network storage are enabled to be combined with the data storage resources and computing resources of the network storage node; and
   wherein the network module includes a negotiation control module configured to provide the computation services via at least a command console user interface.

2. The network storage node according to claim 1, wherein the network module comprises a storage management module and the negotiation control module.

3. The network storage node according to claim 2, wherein the negotiation control module is communicatively coupled to the storage management module and configured to negotiate allocation of the computing resources between the storage management module and the negotiation control module.

4. The network storage node according to claim 2, wherein the negotiation control module is communicatively coupled to the storage management module and configured to logically isolate the data storage resources and the computing resources.

5. The network storage node according to claim 2, wherein the negotiation control module is communicatively coupled to the storage management module to handle one or more input/output (I/O) operations.

6. The network storage node according to claim 2, wherein the negotiation control module is further configured to provide an interface for the computation services, wherein the computation services are implemented at least partially on a virtual machine.

7. The network storage node according to claim 2, wherein at least one of the negotiation control module and the storage management module is implemented at least partially based on a virtual machine.

8. The network storage node according to claim 2, wherein the negotiation control module is further configured to access the data storage resources or the computing resources based on the storage management module.

9. The network storage node according to claim 1, wherein the data storage resources and the computing resources comprise a network storage node.

10. The network storage node according to claim 9, wherein a plurality of network storage nodes are combined to form a network storage system.

11. The network storage node according to claim 10, a negotiation control module in a first network storage node within a first network storage system is communicatively coupled to a negotiation control module in a second network storage node within the network storage system.

12. The network storage node according to claim 1, wherein the negotiation control module is further configured to provide the computation services via a monitoring dashboard user interface.

13. The network storage node according to claim 1, wherein the network module includes a storage management module configured to provide the computation services via interfaces for deploying user applications and exporting application outputs.

14. A method for providing data storage and data storage services using a network storage node, the network storage node comprising one or more data storage resources and computing resources, the method comprising:
   using the computing resources to provide data storage services based on the data storage resources;
   providing computation services to a client based on the computing resources, wherein the computing resources were originally allocated only for data storage services;
   providing an interface enabled to communicate with a second network storage node, wherein resources from the second network storage are enabled to be combined with the data storage resources and computing resources of the network storage node; and
   providing the computation services via at least a command console user interface.

15. The method according to claim 14 further comprising: logically isolating the data storage resources and the computing resources.

16. The method according to claim 14 further comprising: handling one or more input/output (I/O) operations.

17. The method according to claim 14, further comprising: providing an interface for the computation services, and wherein the computation services are implemented at least partially based on a virtual machine.

18. A computer program product for managing resources on a network, the network comprising a network storage node, the network storage node comprising data storage resources and computing resources, the computer program product being tangibly stored in a non-transient computer readable medium and including machine executable instructions, the machine executable instructions, when being executed, causing a machine:
   using the computing resources to provide data storage services based on the data storage resources, wherein the computing resources comprise a Central Processing Unit CPU and a memory, and negotiating allocation of the computing resources between a storage management module and a negotiation control module, and logically isolating the data storage resources and the computing resources, and handling one or more input/output (I/O) operations; and
   providing computation services to a client based on the computing resources, and further providing an interface for the computation services, wherein the computation services are implemented at least partially based on a virtual machine, wherein the computing resources were originally allocated only for data storage services;
   providing an interface enabled to communicate with a second network storage node, wherein resources from the second network storage are enabled to be combined with the data storage resources and computing resources of the network storage node; and
   providing the computation services via at least a command console user interface.

* * * * *